(12) United States Patent
Masumoto et al.

(10) Patent No.: US 8,711,373 B2
(45) Date of Patent: Apr. 29, 2014

(54) IMAGE FORMING APPARATUS AND CONTROL METHOD THEREFOR

(75) Inventors: Kazuyuki Masumoto, Yokohama (JP); Atsushi Shimazaki, Yokohama (JP); Michihei Murayama, Tachikawa (JP); Shigeru Mizoguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1193 days.

(21) Appl. No.: 11/865,334

(22) Filed: Oct. 1, 2007

(65) Prior Publication Data

US 2008/0100710 A1    May 1, 2008

(30) Foreign Application Priority Data

Oct. 25, 2006    (JP) .................................. 2006-290266

(51) Int. Cl.
*H04N 5/225*    (2006.01)

(52) U.S. Cl.
USPC ......... 358/1.13; 358/1.12; 358/1.14; 358/1.2; 358/1.9; 709/220; 709/221; 709/201; 709/204; 400/62; 348/207.2

(58) Field of Classification Search
None
See application file for complete search history.

(56) References Cited

U.S. PATENT DOCUMENTS

| | | | |
|---|---|---|---|
| 5,954,436 A * | 9/1999 | Kageyama et al. | 400/188 |
| 6,117,014 A * | 9/2000 | Aoyama et al. | 463/43 |
| 6,298,405 B1 * | 10/2001 | Ito et al. | 710/107 |
| 6,327,051 B1 * | 12/2001 | Moro et al. | 358/1.9 |
| 7,014,374 B2 * | 3/2006 | Hamaguchi et al. | 400/62 |
| 7,037,008 B2 * | 5/2006 | Ota | 400/76 |
| 7,493,487 B2 * | 2/2009 | Phillips et al. | 713/168 |
| 2007/0180071 A1 * | 8/2007 | Koide | 709/220 |

FOREIGN PATENT DOCUMENTS

| | | |
|---|---|---|
| JP | 04-086838 A | 3/1992 |
| JP | 3530847 | 3/2004 |
| JP | 2006-221296 A | 8/2006 |

OTHER PUBLICATIONS

The above references were cited in a Apr. 11, 2011 Japanese Office Action, which is enclosed without an English Translation, that issued in Japanese Patent Application No. 2006-290266.

* cited by examiner

*Primary Examiner* — Ashish K Thomas
(74) *Attorney, Agent, or Firm* — Cowan, Liebowitz & Latman, P.C.

(57) ABSTRACT

Print settings changed in a direct printing-capable image forming apparatus are treated as either temporary changes or permanent changes depending on the state of the image forming apparatus when the print settings are changed. Specifically, print settings changed when the image forming apparatus is in a direct printing-executable state are treated as temporary, whereas print settings changed when the image forming apparatus is in a direct printing-inexecutable state are treated as permanent. Usability regarding print settings is improved.

10 Claims, 8 Drawing Sheets

IMAGE FORMING APPARATUS AND CONTROL METHOD THEREFOR

BACKGROUND OF THE INVENTION

1. Field of the Invention

The present invention relates to an image forming apparatus and a control method therefor, and more particularly, to an image forming apparatus having a function that carries out direct printing according to print settings and a control method therefor.

2. Description of the Related Art

In recent years, digital cameras that record sensed images in digital data format and mobile devices that incorporate a digital camera (such as mobile phones and mobile information terminals) have come to be widely used. In the present specification, digital cameras and apparatuses equipped with a digital camera function are hereinafter referred to as mobile terminals. Conventionally, when printing an image sensed using a mobile terminal, typically the digital image data to be printed is read into a PC (computer) and printed using a printer which is available to the PC.

By contrast, an apparatus that supports direct printing that allows a user to print digital image more easily has also been proposed (for example, JP-3530847-B). In direct printing, digital image data is supplied directly from the mobile terminal or from a storage medium on which the digital image data is recorded to a color printer and the color printer prints the digital image data. In addition, standards relating to direct printing have been established. Thus, for example, the Camera & Imaging Products Association (CIPA) standard PictBridge (CIPA DC-001-2003) is one such typical standard relating to direct printing using mobile terminals and printers made by different manufacturers.

In card-direct printing, in which the storage medium is attached to the printer to supply the digital image data, print settings are set using the printer control panel. By contrast, with direct printing using the mobile terminal as in PictBridge, the print settings can be set at the mobile terminal side. Even in this case, however, depending on the print setting item, it is also possible to set the print settings using the printer control panel, without carrying out setting from the mobile terminal.

In a printer that supports this type of direct printing (hereinafter referred to as a photo-direct printer), the print settings remain in the last set state. As a result, particularly when the same photo-direct printer is used by multiple users, sometimes the settings are changed by another user and a preferred setting is not maintained, thus complicating setting.

In other words, when one user attempts to print digital image data, it is necessary for that user to confirm whether or not the print settings that a previous user used are desired print settings, and to reset the print settings if those print settings used by the previous user are not desired print settings.

For example, assume that two persons, A and B, share a single photo-direct printer. If the current printer print settings are the settings desired by A, then when B attempts to print using different print settings the print settings are changed to the print settings that B desires. If B does not restore the print settings to the previous print settings when B finishes printing, then when A next attempts to print it is necessary for A to once more change the print settings to the print settings that A desires.

SUMMARY OF THE INVENTION

The present invention is conceived in light of the problems of the conventional art as described above, and provides an image forming apparatus of improved usability with respect to print settings and a control method therefor.

According to an aspect of the present invention, there is provided an image forming apparatus having a function to carry out direct printing according to print settings, comprising: a determination unit that determines whether or not the image forming apparatus is in a state in which the direct printing is executable; a detection unit that detects a change of the print settings; a setting change unit that reflects the changed print settings in current print settings in a case in which a change of the print settings is detected when the image forming apparatus is determined by the determination unit to be in a state in which direct printing is executable, and reflects the changed print settings in the current print settings as well as saves the changed print settings as default settings in a case in which a change of the print settings is detected when the image forming apparatus is determined by the determination unit to be in a state in which direct printing is inexecutable; a print execution unit that executes direct printing according to the current print settings; and a setting restoration unit that restores the current print settings to the default settings upon entering a state in which the direct printing is inexecutable.

According to another aspect of the present invention, there is provided an image forming apparatus control method having a function to carry out direct printing according to print settings, comprising: a determination step of determining a state in which the direct printing is executable; a detection step of detecting a change of the print settings; a setting change step of reflecting the changed print settings in current print settings in a case in which a change of the print settings is detected when it is determined by the determination step that the image forming apparatus is in a state in which direct printing is executable, and reflecting the changed print settings in the current print settings as well as saving the changed print settings as default settings in a case in which a change of the print settings is detected when its is determined by the determination step that the image forming apparatus is in a state in which direct printing is inexecutable; a print execution step of executing direct printing according to the current print settings; and a setting restoration step of restoring the current print settings to the default settings upon entering a state in which the direct printing is inexecutable.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

(Summary Description of Printer)

Figure 1:
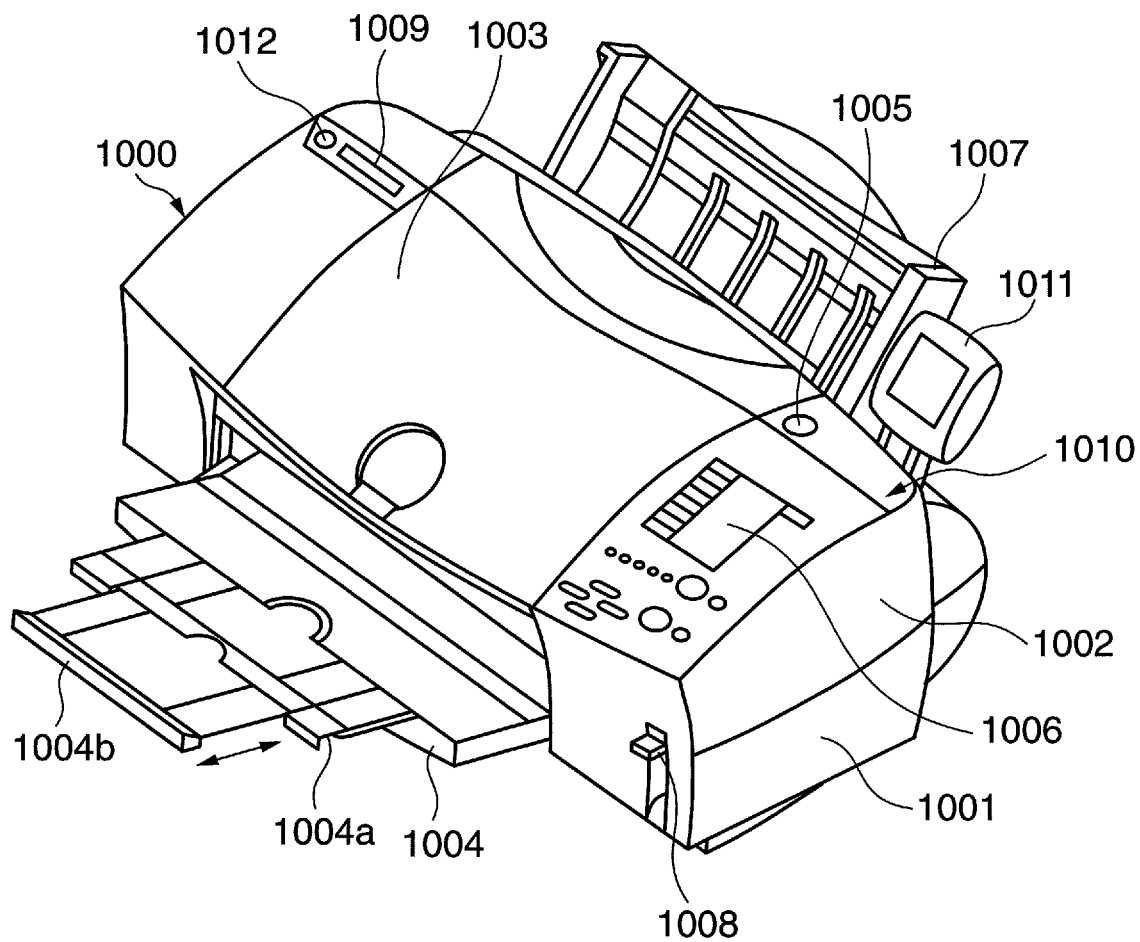
FIG. 1 is a perspective view showing an example of an external appearance of a photo-direct printer 1000 as an example of an image forming apparatus having a function for carrying out direct printing in accordance with print settings, according to one embodiment of the present invention.

FIG. 1 is a perspective view showing an example of an external appearance of a photo-direct printer (hereinafter simply "printer") 1000 as one example of an image forming apparatus having a function for carrying out direct printing in accordance with print settings, according to one embodiment of the present invention.

In FIG. 1, the printer 1000 is equipped to:

(1) function as an ordinary PC printer that receives data from a host computer (PC) and prints; and
(2) function as a photo-direct printer that acquires digital image data directly from a storage medium such as a memory card or a mobile terminal (neither of which is shown) and prints.

A body that forms a shell of the PD printer 1000 has external members consisting of a lower case 1001, an upper case 1002, an access cover 1003, and a discharge tray 1004. The lower case 1001 forms approximately the lower half of the PD printer 1000 and the upper case 1002 forms approximately the upper half of the PD printer 1000, respectively. The combination of these two cases forms an empty three-dimensional structure, in the top and front portions of which respective openings are formed.

Further, the discharge tray 1004 is retained along one edge by the lower case 1001 so as to be rotatable thereabout, such that the opening formed in the front of the lower case 1001 can be opened and closed by that rotation. By rotating the discharge tray 1004 forward so as to open the opening during recording (printing), printing media such as paper or the like can be discharged therefrom, and moreover, the discharged printing media can be sequentially stacked. In addition, two auxiliary trays 1004a and 1004b are contained in the discharge tray 1004. By pulling the auxiliary trays 1004a and 1004b outward as necessary, the size of the discharge tray 1004 can be enlarged or reduced to fit the size of the printing media.

The access cover 1003 is retained along one edge by the upper case 1002 so as to be rotatable thereabout, such that the opening formed in the top can be opened and closed. Opening the access cover 1003 enables a recording head cartridge, not shown, or an ink tank, not shown, contained in the body to be replaced. It should be noted that, although not specifically shown, opening and closing the access cover 1003 causes a projection formed on the rear surface of the access cover 1003 to rotate a cover lever that opens and closes the cover. By detecting the position of the cover lever with a micro switch or the like, the state of the access cover itself, i.e., whether opened or closed, can be detected.

In addition, a power key 1005 is provided on the top of the upper case 1002. A control panel 1010 equipped with a display unit 1006 and a variety of switches and the like is provided on the right side of the upper case 1002. A detailed description of the structure of the control panel 1010 is given later with reference to FIG. 2. An automatic feed unit 1007 automatically feeds stacked printing media into the apparatus body. A paper interval selection lever 1008 is a lever for regulating the interval between the recording head and the printing medium. A card slot 1009 is a slot for reading and writing to and from a storage medium such as a memory card, in the interior of which is provided a connector that accommodates the card. In order to accommodate memory cards of a variety of different standards used in ordinary digital cameras, the card slot 1009 may include multiple slots according to the type of memory card.

An external display device 1011 is a display device detachably connected to the body of the printer 1000. The external display device 1011 is used to display images of each frame or an index image, for example when specifying something to print from among digital image data stored on the storage medium attached to the card slot 1009.

A connector 1012 is a connector for attaching a communication cable to the mobile terminal to be described later. Ordinarily, the mobile terminal is usually equipped with a USB (Universal Serial Bus) as the connection interface for connection to an external device. Accordingly, in the printer 1000 of the present embodiment as well, the connector 1012 is described as a USB connector. Of course, alternatively, a connector other than a USB connector (such as an IEEE 1394 connector) may be used.

At the same time, the PD printer 1000 is also provided with an interface in order to implement printing from the personal computer (PC) as well. Ordinarily, once a printer is connected to a PC, barring special circumstances the printer remains in that connected state, and therefore the connector for the connection interface is provided on the back surface of the PD printer 1000, not shown. The PC connection interface may, for example, be a Centronics Corporation-specification parallel interface (IEEE 1284), a USB interface, or the like, but is in any case an interface that supports a two-way communication function.

(Control Panel 1010)

Figure 2:
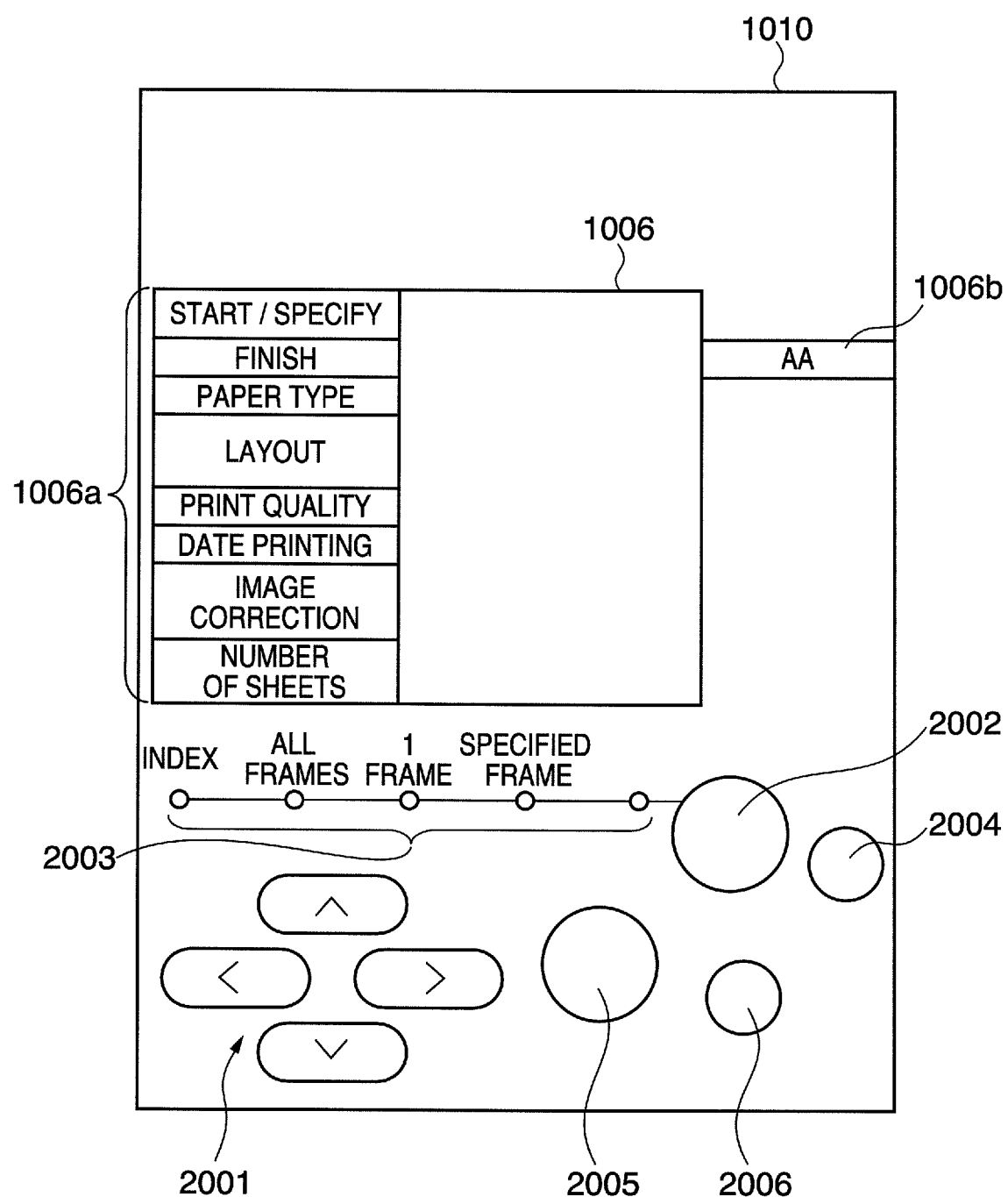
FIG. 2 is a diagram showing an example of an external appearance of a control panel 1010 of the printer 1000 according to one embodiment of the present invention.

FIG. 2 is a diagram showing an example of an external appearance of the control panel 1010 of the printer 1000 according to the present embodiment.

In the drawing, menu items for setting settings related to setting items 1006a, 1006b printed on lateral outer edges are displayed on the display unit 1006.

As setting items there are, for example, the following: Items that set a lead number or a specified frame number of that which the user wishes to print from among a plurality of digital image data (start frame specify/print frame specify) and items that set a final frame number where the user wishes to finish printing; an item that sets the number of copies to be printed (no. of copies); an item that sets the type of paper to be used in printing (paper type); an item that sets the number of images to be allocated to one sheet of paper (layout); an item that specifies the quality of the printing (print quality); an item that specifies whether or not to print the date of image sensing (date printing); an item that specifies whether or not to correct a photograph and print (image correction); an item that displays the number of sheets necessary for printing (number of sheets); and so forth.

These setting items are selected or a value for them specified using cursor keys 2001. A mode key 2002 is a key for switching between types of printing (index printing, all-frames printing, single-frame printing). Each time the mode key 2002 is pressed the type of printing is changed. In addition, the user can identify the type of printing because an LED 2003 corresponding to the type of printing currently set is lit. A maintenance key 2004 enables the user to specify execution of maintenance of the printer, such as print head cleaning. A print start key 2005 is pressed when the user instructs the start of printing or when the maintenance setting is established. A print cancel key 2006 is pressed when the user cancels printing or instructs cancellation of maintenance.

(Printer 1000 Hardware Configuration)

Figure 3:
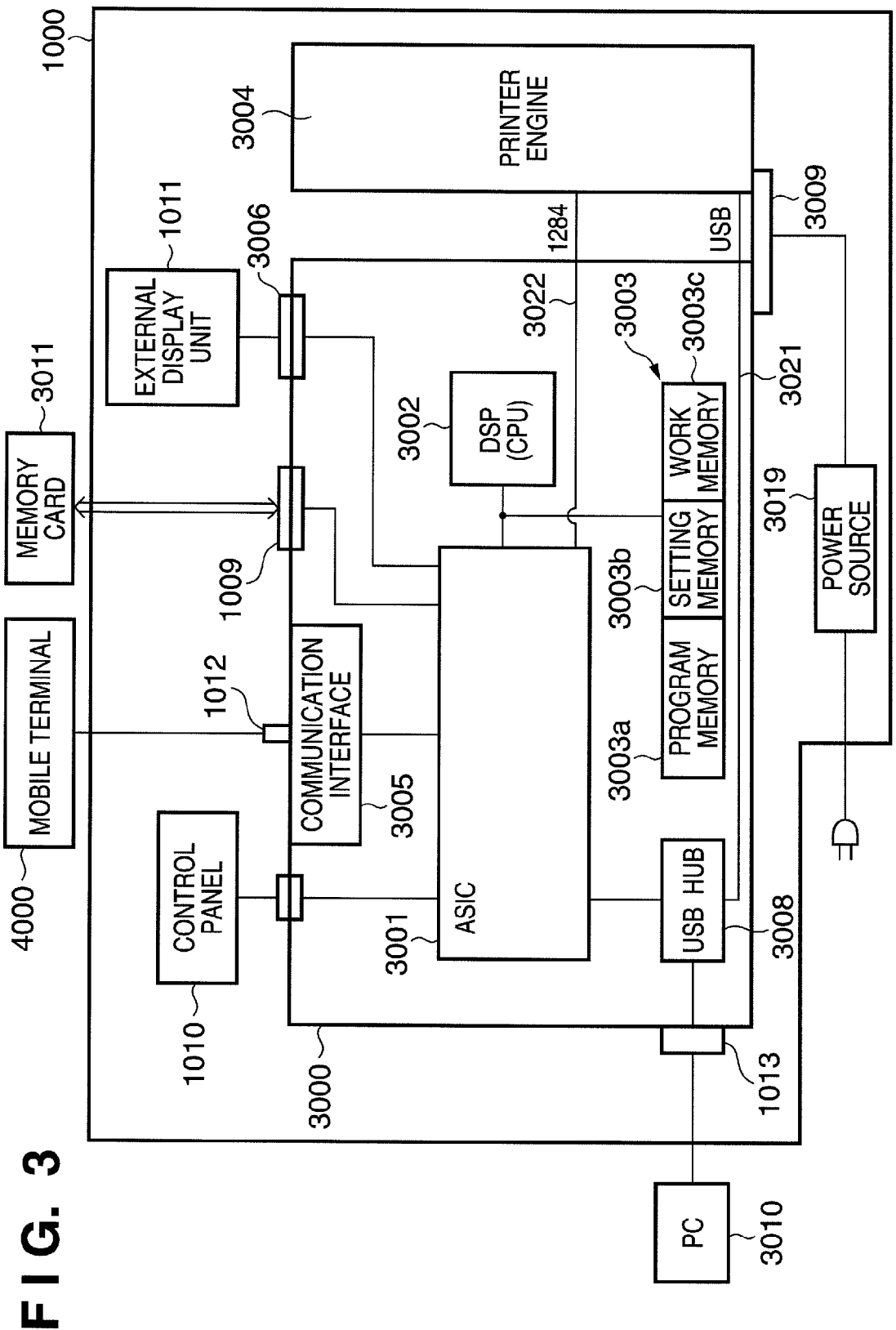
FIG. 3 is a block diagram illustrating a relation between an example of a hardware configuration of the printer 1000 and an external device according to one embodiment of the present invention.

FIG. 3 is a block diagram illustrating a relation between an example of a hardware configuration of the printer 1000 and an external device according to the present embodiment. In FIG. 3, portions identical to those shown in the drawings described above are given identical reference characters and descriptions thereof omitted.

In FIG. 3, reference character 3000 indicates a control unit (control board) and 3001 indicates an ASIC (Application Specific Integrated Circuit) (a customized LSI). The ASIC 3001 is connected to all parts of the printer 1000. Reference character 3002 indicates a DSP (digital signal processor) with a CPU inside. The DSP 3002 executes a previously prepared control program and implements processing related to direct printing to be described later while using all parts in the printer via the ASIC 3100. Further, the DSP 3002 also executes image processing such as conversion from luminance signal (RGB) to density signal (CMYK), scaling, gamma conversion, and error diffusion. Reference character 3003 indicates a memory module. A program memory 3003a is a nonvolatile memory that stores the control program for the DSP 3002. The setting memory 3003b is a nonvolatile memory that stores various setting values including permanent settings to be described later. The work memory 3003c is a memory that temporarily stores programs during execution, image data, and so forth.

Reference character 3004 indicates a printer engine, which, in the present embodiment, is an ink-jet type of printer engine capable of printing color images using multiple colors of color ink. Reference character 3005 indicates a communication interface for connecting a mobile terminal 4000. In the present embodiment, the communication interface is a USB interface. Therefore, the communication interface 3005 is provided with the USB connector 1012.

Reference character 3006 indicates a connector for connecting the external display device 1011. Reference character 3008 indicates a USB hub (USB HUB), connected to the ASIC 3001, a USB connector 1013 and the printer engine 3004. The USB hub 3008 outputs digital image data as is to the printer engine 3004 via a USB 3021 when carrying out printing based on digital image data supplied from a PC 3010 connected to the printer 1000 via the USB 1013, thus enabling the PC 3010 to exchange data and signals directly with the printer engine 3004 and execute printing. In other words, the printer 1000 functions as an ordinary PC printer.

Reference character 3009 indicates a power source connector that inputs direct current voltage converted from a commercial power source by a power source 3019. The PC 3010 is an ordinary personal computer, and 3011 is the memory card described above.

It should be noted that the exchange of signals between the control unit 3000 and the printer engine 3004 is carried out through the above-described USB 3021 or an IEEE 1284 bus 3022.

(Summary Description of Mobile Terminal)

Figure 4:
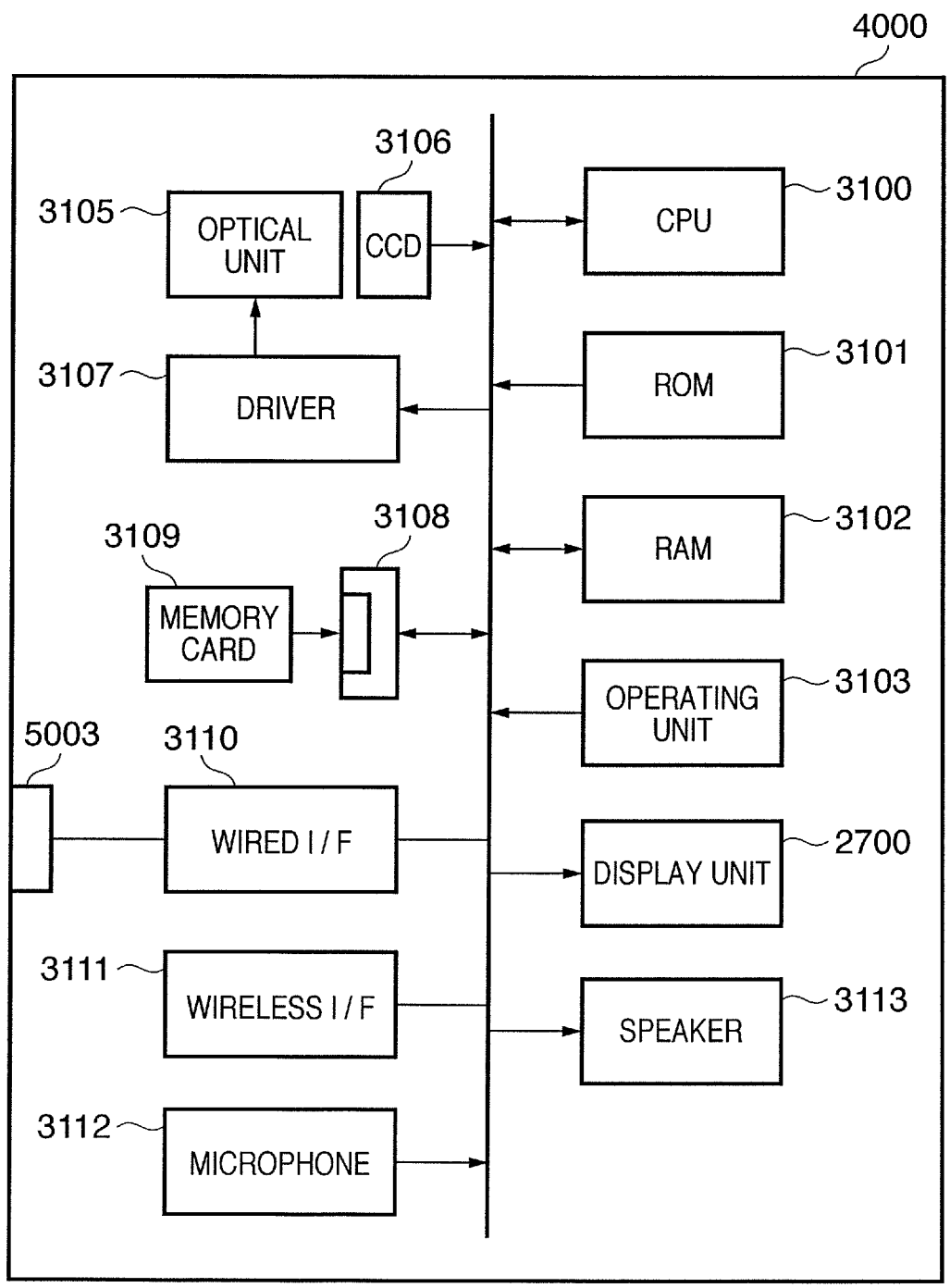
FIG. 4 is a block diagram of an example of a configuration of a mobile terminal 4000 as an external device according to one embodiment of the present invention.

FIG. 4 is a block diagram of an example of a configuration of a mobile terminal 4000 as an external device according to the present embodiment.

In the drawing, a CPU 3100 executes a control program and exerts overall control of the mobile terminal 4000. A ROM 3101 stores the control program of the CPU 3100. The RAM 3102 is used as a work area for the CPU 3100 and as a program area or a storage area for digital image data. In an operating unit 3103 are included a variety of keys, buttons, switches and so forth to allow the user to carry out a variety of operations with the mobile terminal. The display unit 2700 is for example an LCD. The display unit 2700 functions as an electronic viewfinder and is used to display sensed digital image data or a GUI for use in carrying out various settings.

An optical unit 3105 is composed chiefly of lenses and their drive systems. A CCD 3106 is one example of an image sensing element, which may also be a CMOS image sensor. A driver 3107 controls driving of the optical unit 3105 under the control of the CPU 3100. A memory card 3109 as one example of a detachable storage medium is connected to a connector 3108. A wire I/F 3110 is an interface for wired connection of a PC or the printer 1000, and in the present embodiment is a USB interface (slave side) The wire interface I/F 3110 has a connector 5003 for wired connection.

By CPU 3100 control, digital image data stored in the RAM 3102 or on the memory card 3109 is output to an external device such as a printer connected to the connector 5003 via the wire I/F 3110 and the connector 5003. In addition, the CPU 3100, through the wire I/F 3110, transmits data and control information necessary for a direct printing process to be described later to the external device.

A wireless I/F 3111 is an interface for conducting wireless communication. For example, in a case in which the mobile terminal 4000 is a mobile phone, the wireless I/F 3111 is an interface for carrying out communication with the base station. If the mobile terminal 4000 is a digital camera, the wireless I/F 3111 is for example an interface for carrying out communication that conforms to IEEE 802.11x, Bluetooth, or IrDa standards or the like. Reference characters 3112 and 3113 indicate a microphone and a speaker, respectively. When the mobile terminal 4000 is a mobile phone, the microphone 3112 and the speaker 3113 can be used for voice communication. When the mobile terminal 4000 is a digital camera, the microphone 3112 and the speaker 3113 can be used for sound recording and audio output during moving image sensing and the like.

(Connection between Mobile Terminal and Printer)

Figure 5:
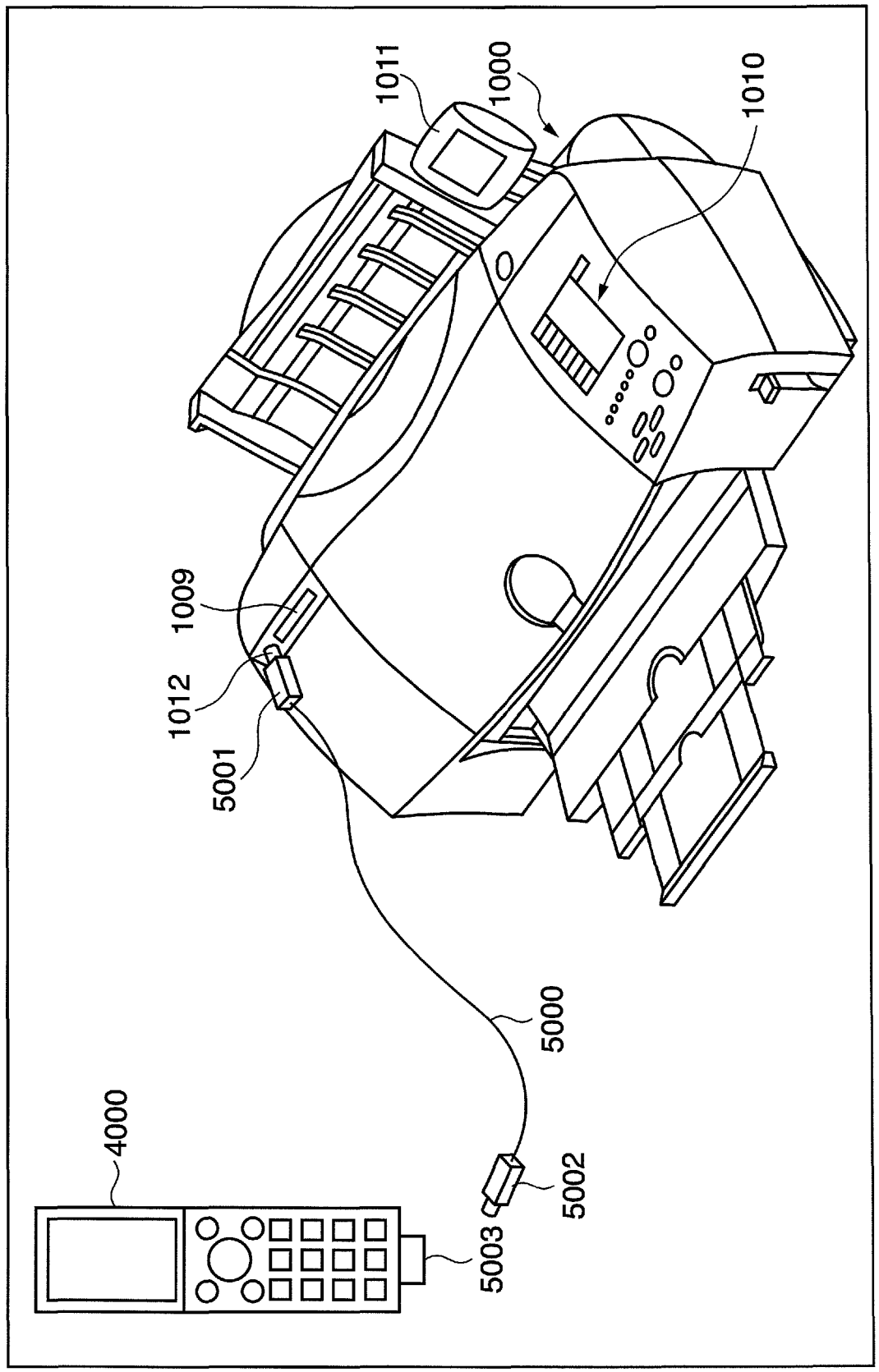
FIG. 5 is a diagram illustrating a connection between the printer 1000 and the mobile terminal 4000 according to one embodiment of the present invention.

FIG. 5 is a diagram illustrating a connection between the printer 1000 and the mobile terminal 4000 according to the present embodiment. In FIG. 5, portions identical to those shown in the drawings described above are given identical reference characters and descriptions thereof omitted.

In the drawing, a cable 5000 is provided with a connector 5001 that is connected to the connector 1012 of the PD printer 1000 and a connector 5002 that is connected to the connector 5003 of the mobile terminal 4000. As described above, in the present embodiment the cable 5000 also is a USB cable, in order to connect the printer 1000 and the mobile terminal 4000 using a USB interface.

Thus, as described above, the mobile terminal 4000 is configured so as to be able to output digital image data saved in a built-in memory or on a storage medium such as a detachable memory card via the connection 5003. As shown in FIG. 5, by connecting the printer 1000 and the mobile terminal 4000 through the cable 5000, the digital image data that the mobile terminal 4000 holds can be supplied directly to the printer 1000 to enable direct printing. It should be noted that, in the present specification, a configuration that directly supplies digital image data that the mobile terminal 4000 or the memory card 3011 holds to the printer 1000 and enables printing to be carried out at the printer 1000 is called a direct printing system. In FIG. 5, a configuration in which the mobile terminal 4000 and the printer 1000 are communicably connected by the cable 5000 is one example of such direct printing system.

(Direct Printing Process (1))

Figure 6A:
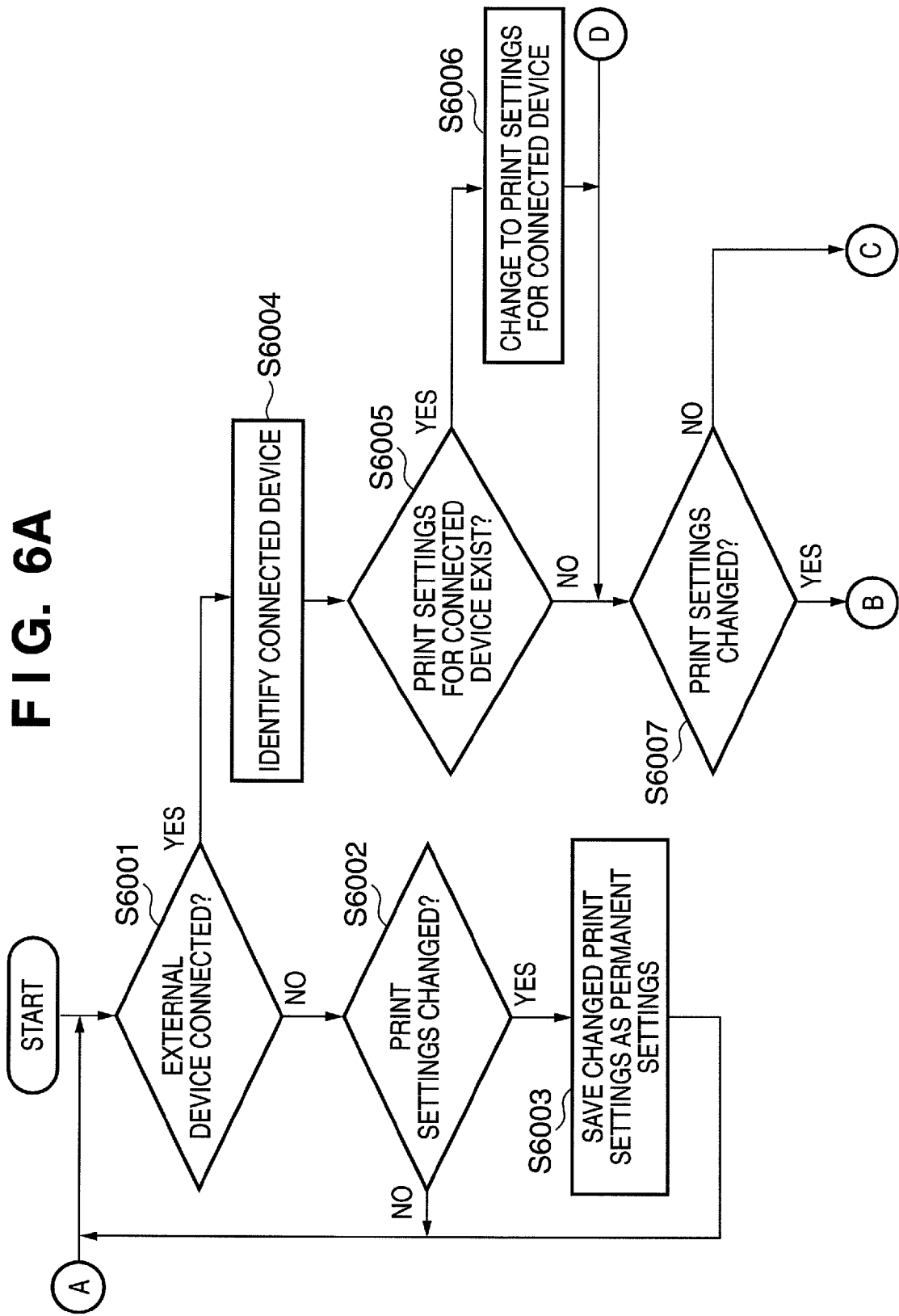
FIGS. 6A and 6B are flow charts illustrating operations pertaining to a direct printing process performed by the printer 1000 according to one embodiment of the present invention.
Figure 6B:
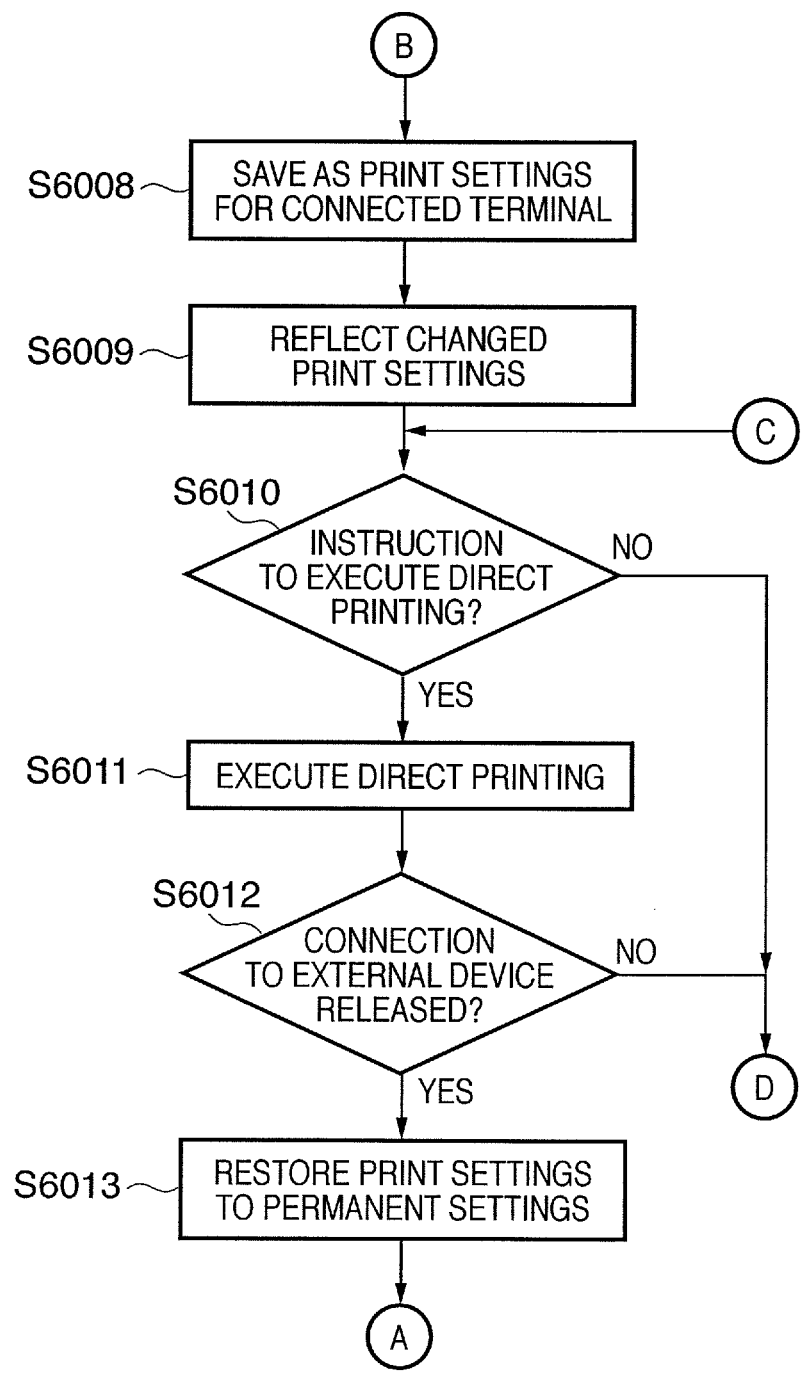

FIGS. 6A and 6B are flow charts illustrating operations pertaining to a direct printing process performed by the printer 1000 according to the present embodiment.

The printer 1000 according to the present embodiment determines if changed print settings are temporary or permanent depending on whether or not the printer 1000 is in a direct printing-executable state. Here, a description is given of a case in which a state in which an external device is connected to the connector 1012 of the communication interface 3005 is a direct printing-executable state. It should be noted that, here, "permanent" print settings means so-called default settings for the print settings, and are settings stored in the setting memory 3003b. In addition, it should be noted that although these permanent settings, as is described later, can be changed as convenient by operation of the operating unit of the printer, they may also be changed by remote operation from the connected personal computer.

It should be noted that operations according to the direct printing process described below, as described above, are implemented by the DSP 3002 executing a control program and controlling the parts of the printer 1000 in response to throwing the printer 1000 power source on.

First, in step S6001, the DSP 3200 acting as a determination unit, checks whether or not an external device such as the mobile terminal 4000 is connected to the connector 1012 (connection unit) of the communication interface 3005. It should be noted that, here, "external device is connected" means a state in which the printer 1000 can recognize the external device. Therefore, for example, a state in which the mobile terminal 4000 without the power turned on is connected to the connector 1012 by the cable 5000 is not included within an "external device is connected" state.

When an external device is not connected, first, permanent settings information stored in the setting memory 3003b is read out and set to the printer current settings. Then, in S6002, the DSP 3200 as a detection unit determines from the permanent settings information whether or not the printer current settings have been changed. Specifically, the DSP 3002 determines whether or not a print setting instruction has been input by operation of the cursor keys 2001 of the control panel 1010.

If in S6002 input of a print setting instruction is detected, then the DSP 3002 as a setting change unit saves the changed print settings (the print settings at the time the instruction is input) as permanent settings (default settings) in for example a predetermined area of the setting memory 3003b (S6003). In addition, at the same time, the DSP 3002 as a setting change unit causes the changed print settings to be reflected in the current print settings. The DSP 3002 updates the current print settings stored for example in a predetermined area of the work memory 3003c with the changed print settings. If in step S6002 no print setting instruction is detected, then after the process of S6003 the DSP returns to the process of S6001.

If in S6001 connection of an external device is detected, then the DSP 3002 as an acquisition unit in S6004 attempts to identify the external device. Here, because in the present embodiment the external device is connected via a USB interface, the external device can be identified by acquiring, for example in an initialization process during connection, device-specific information for the external device, such as a device ID.

It should be noted that although an appropriate error process or the like is carried out in cases such as when the connected external device is not a direct printing-capable device, such is not directly related to the present invention and therefore a description thereof shall be omitted. Here, the external device is assumed to be a direct printing capable-device like the mobile terminal 4000 described above.

In S6005, the DSP 3002 as a setting change unit determines whether or not print settings for the external device identified in S6004 are already saved in the printer 1000. For example, the DSP 3002 associates information capable of identifying the device (device-specific information) such as the device ID with print settings and stores them in the setting memory 3003b. Then, in S6005, the DSP 3002 confirms whether or not print settings associated with the device-specific information for the external device acquired in S6004 are present in the setting memory 3003b.

If print settings corresponding to the external device identified in S6004 are found, then the DSP 3002 as setting change unit reads those print settings out from the setting memory 3003b. Then, the DSP 3002 updates the current print settings stored for example in a predetermined area of the work memory 3003c with the read-out print settings, changing the print settings.

By contrast, if in S6004 the external device cannot be identified, or if print settings corresponding to the device-specific information cannot be found, then the DSP 3002 moves processing to S6007. In S6007, as in S6002 the DSP 3200 as detection unit determines if the print settings have been changed. It should be noted that the print setting instruction detected here is not only that implemented by operation of the control panel 1010 but may also be that input via the communication interface 3005 from the external device.

In S6007, if a print setting instruction has been input, then the DSP 3002 as setting change unit saves the print settings at that time. At this point, the DSP 3002 associates the device-specific information acquired in S6004 with the print settings and stores them in the setting memory 3003b (S6008). If print settings associated with the same device-specific information already exist, then, for example, such print settings are overwritten and saved.

Thereafter, the DSP 3002 causes the changed print settings to be reflected in the current print settings (S6009). Specifically, current print settings values stored, for example, in a predetermined area of the work memory 3003c are revised using the values at the time of input of the print setting instruction. In this case, the permanent settings stored and saved in the setting memory 3003b do not change.

If in S6007 input of a print setting instruction is not detected, then the DSP 3002 skips the processes of S6008 and S6009 and moves processing to step S6010.

In S6010, the DSP 3002 determines whether or not there has been input of an instruction to execute direct printing. This execution instruction is not only that implemented by operation of the control panel 1010 but may also be that input via the communication interface 3005 from the external device.

If input of an instruction to execute direct printing is not detected, then the DSP 3002 repeats processing from S6007. On the other hand, if input of an execution instruction is detected, then the DSP 3002 in S6011 conducts a printing process. This printing process may, for example, be implemented by carrying out the procedure specified by the PictBridge standard described above between the DSP 3002 and the CPU 3100 of the mobile terminal 4000. In other words, the DSP 3002 acquires the digital image data to be printed from the external device and controls the printer engine 3004 so as to print the digital image data according to the print settings. The printer engine 3004, in accordance with the control from the DSP 3002, prints to the printing medium while controlling a print head and a printing medium feeding mechanism.

When the printing process is finished, the DSP 3002 as determination unit determines whether or not connection to the external device has been released (that is, if the state of connection has ended) (S6012). If the state of connection to the external device continues as before, then the DSP 3002 repeats processing from S6007.

By contrast, if release of the connection to the external device is detected, then the DSP 3002 as a setting restoration unit reads out the permanent settings from the setting memory 3003b and restores the current print settings to the permanent settings (S6013). In other words, the content of the current print settings stored in a predetermined area of the work memory 3003c are revised to the content of the permanent settings. Thereafter, the DSP 3002 returns to S6001 and continues processing.

(Direct Printing Process (2))

In the flow charts shown in FIGS. 6A and 6B, a description is given of a direct printing process using an external device. However, the same operations can also be carried out in a card-direct printing process.

Figure 7:
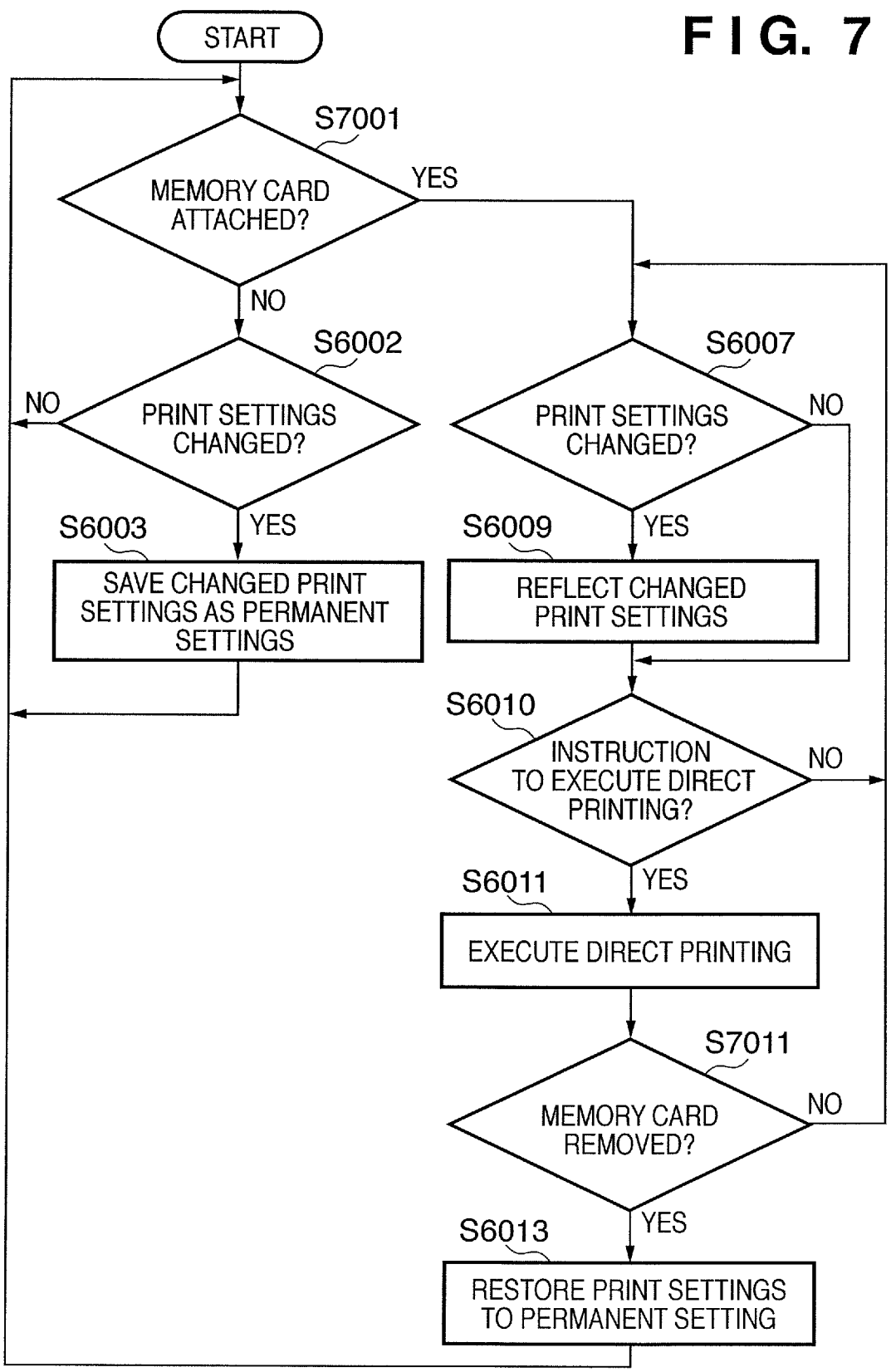
FIG. 7 is a flow chart illustrating operations pertaining to a card-direct printing process performed by the printer 1000 according to one embodiment of the present invention.

FIG. 7 is a flow chart illustrating operations pertaining to a card-direct printing process performed by the printer 1000 according to the present embodiment. It should be noted that, in FIG. 7, processes identical to those in FIGS. 6A and 6B are given the same reference characters.

The printer 1000 according to the present embodiment determines if changed print settings are temporary or permanent depending on whether or not the printer 1000 is in a direct printing-executable state. Here, a description is given of a case in which a state in which a memory card is connected to the card slot 1009 is a direct printing-executable state.

It should be noted that operations according to the card-direct printing process described below, as described above, are implemented by the DSP 3002 executing a control program and controlling the parts of the printer 1000.

First, in step S7001, the DSP 3200 as a determination unit checks whether or not the memory card 3011 is attached to the card slot 1009. It should be noted that, here, "memory card 3011 is attached" means a state in which the printer 1000 can recognize the memory card 3011.

Alternatively, it is also possible to make a state in which digital image data can be supplied to the printer 1000 a state in which the "memory card 3011 is attached". For example, assume a state in which a memory card on which an image file in a printable data format (for example, JPEG, or GIF) or a memory card on which an image file that conforms to a camera file system such as DCF is attached. In this case, the determination can be made by the DSP 3002 checking the directory of the attached memory card.

If the memory card 3011 is not attached, then the DSP 3002 carries out the processes of S6002 and S6003 as described above. Then, in a case in which a change is made to the print settings, the DSP 3002 saves the changed print settings as permanent settings and reflects them in the current print settings.

If in S7001 attachment of the memory card 3011 is detected, then the DSP 3002 carries out the processes of S6007, S6009, S6010 and S6011. In other words, if the print settings have been changed, then the DSP 3002 reflects the changed print settings in the current print settings.

After the direct printing process of S6011 is finished, in S7011 the DSP 3002 as determination unit determines whether or not the memory card 3011 has been removed from the card slot 1009. If the memory card 3011 has not been removed, then the DSP 3002 repeats processing from S6007.

By contrast, if removal of the memory card 3011 from the card slot 1009 is detected, then the DSP 3002 as setting restoration unit reads out the permanent settings from the setting memory 3003b and restores the current print settings to the permanent settings (S6013). Thereafter, the DSP 3002 returns to S7001 and continues processing.

Thus, as described above, the photo-direct printer of the present embodiment has a determination function to determine whether or not the printer is in a direct printing-executable state. Specifically, for example, if a direct printing-capable external device is connected or a detachable storage medium is attached, then it is determined that the printer is in a direct printing-executable state, whereas if a direct printing-capable external device is not connected or a detachable storage medium is not attached, then it is determined that the printer is not in a direct printing-executable state.

Then, when a change in the print settings in a direct printing-executable state is detected, the printer treats such change as a temporary change, whereas when the print settings are changed in a state in which direct printing is inexecutable, such change is treated as a permanent change. Further, once the direct printing process according to the print settings is finished, the printer restores the print settings to the original print settings, that is, to the permanent settings.

As a result, a change in the print settings carried out in a direct printing-executable state is automatically discarded after that printing process is finished, and a change in print settings carried out by one user during direct printing do not affect subsequent processes. Therefore, for example, making the print settings of the user that uses direct printing most frequently the permanent settings obviates the need to confirm or change the print settings each time that user carries out direct printing. In addition, such an arrangement also enables other users to eliminate the trouble of restoring the print settings to their original settings after printing is finished. As a result, effort can be reduced for all shared users as a whole.

Further, external device device-specific information and print settings are associated and saved, with existing print settings corresponding to a connected external terminal, if present, used as the current print settings. As a result, when carrying out direct printing using the same print settings at the same terminal, the need to set the print settings each time is eliminated.

It should be noted that, although it goes without saying, the printer 1000 may be configured so as to be able to implement both processes shown in FIGS. 6A, 6B and 7 described above. In that case, as between the direct printing process and the card-direct printing process, it is sufficient to carry out either the processes of FIGS. 6A and 6B or the processes of FIG. 7 depending on which of these two, whether the direct printing process or the card-direct printing process, is to be carried out.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-290266, filed Oct. 25, 2006, which is hereby incorporated by reference herein in its entirety.

What is claimed is:

1. An image forming apparatus having a function to carry out direct printing according to current print settings, wherein the image forming apparatus carries out non-direct printing according to default print settings, comprising:

a memory that separately stores said current print settings and the default print settings;

a setting unit that sets the default print settings stored in the memory as said current print settings in the memory;

a determination unit that determines whether or not an external device, with which the image forming apparatus can carry out direct printing, is connected to said image forming apparatus;

a detection unit that detects a change of said current print settings;

a setting change unit that (1) reflects said detected change to said current print settings to said current print settings stored in the memory in a case in which a change of said current print settings is detected when it is determined by said determination unit that the external device is not connected, and stores said changed current print settings in the memory also as said default settings, and (2) reflects said detected change to said current print settings to said current print settings stored in the memory without storing the changed current print settings as said default print settings in the memory in a case in which a change of said current print settings is detected when it is determined by said determination unit that the external device is connected; and a print execution unit that executes direct printing according to said current print settings, and wherein, if a change of said current print settings was detected when said external device is connected to said image forming apparatus, said setting unit updates said current print settings stored in the memory with said default settings stored in the memory upon disconnection of the external device being determined by said determination unit.

2. The image forming apparatus according to claim 1, wherein said external device is a detachable storage medium.

3. The image forming apparatus according to claim 1, wherein said external device is an external device capable of said direct printing.

4. The image forming apparatus according to claim 3, further comprising an acquisition unit that acquires device-specific information of said external device, wherein, in a case in which a change of said current print settings is detected when it is determined by said determination unit that said external device is connected to said image forming apparatus, said setting change unit associates said changed current print settings with said device-specific information and stores said changed current print settings and said device-specific information in the memory separate from said default print settings.

5. The image forming apparatus according to claim 4, wherein said setting change unit further changes said current print settings to print settings associated with said device-specific information in a case in which print settings associated with said device-specific information have been stored in the memory when said acquisition unit acquires said device-specific information.

6. An image forming apparatus control method having a function to carry out direct printing according to current-print settings, wherein the image forming apparatus carries out non-direct printing according to default print settings and separately stores said current print settings and the default print settings in a memory, comprising:

a setting step of setting the default print settings stored in the memory as said current print settings in the memory;

a determination step of determining whether or not an external device, with which the image forming apparatus can carry out direct printing, is connected to said image forming apparatus;

a detection step of detecting a change of said current print settings;

a setting change step of (1) reflecting said detected change to said current print settings to said current print setting stored in the memory in a case in which a change of said current print settings is detected when it is determined in said determination step that the external device is not connected, and storing said changed current print settings in the memory also as said default print settings, and (2) reflecting said detected change to said current print settings to said current print settings stored in the memory without storing the changed current print settings as said default print settings in the memory in a case in which a change of said current print settings is detected when it is determined in said determination step that the external device is connected;

a print execution step of executing direct printing according to said current print settings; and wherein, if a change of said current print settings was detected when said external device is connected to said image forming apparatus, said setting step updates said current print settings stored in the memory with said default settings stored in the memory upon disconnection of the external device being determined in said determination step.

7. The image forming apparatus control method according to claim 6, wherein said external device is a detachable storage medium.

8. The image forming apparatus control method according to claim 6, wherein said external device is capable of said direct printing.

9. The image forming apparatus control method according to claim 8, further comprising an acquisition step that acquires device-specific information of said external device, wherein said setting change step, in a case in which a change of said current print settings is detected when it is determined in said determination step that said external device is connected to said image forming apparatus, associates said changed current print settings with said device-specific information and stores said changed current print settings and said device-specific information in the memory separate from said default print settings.

10. The image forming apparatus control method according to claim 9, wherein said setting change step further changes said current print settings to print settings associated with said device-specific information in a case in which print settings associated with said device-specific information— have been stored in the memory when said acquisition step acquires said device-specific information.

* * * * *